United States Patent [19]

Huber

[11] Patent Number: 5,159,601
[45] Date of Patent: Oct. 27, 1992

[54] METHOD FOR PRODUCING A TUNABLE ERBIUM FIBER LASER

[75] Inventor: David R. Huber, Warrington, Pa.

[73] Assignee: General Instrument Corporation, Hatboro, Pa.

[21] Appl. No.: 731,535

[22] Filed: Jul. 17, 1991

[51] Int. Cl.[5] ................................................ H01S 3/30
[52] U.S. Cl. ............................................ 372/6; 372/20; 372/34; 372/39; 372/102
[58] Field of Search ...................... 372/6, 20, 34, 102, 372/66

Primary Examiner—Léon Scott, Jr.
Attorney, Agent, or Firm—Barry R. Lipsitz

[57] ABSTRACT

A laser cavity is formed from two mirrors and an erbium fiber gain medium. One mirror is a dichroic mirror and the other is formed by a grating. The grating period determines the wavelength of light that is reflected, and can be changed by physically stretching or constricting the substrate to which the grating is attached. In one embodiment, the laser is tuned by adjusting the dimensions of the grating using a heating element. In another embodiment, the dimensions of the grating are adjusted using a piezoelectric ceramic material to which the grating is mounted.

16 Claims, 2 Drawing Sheets

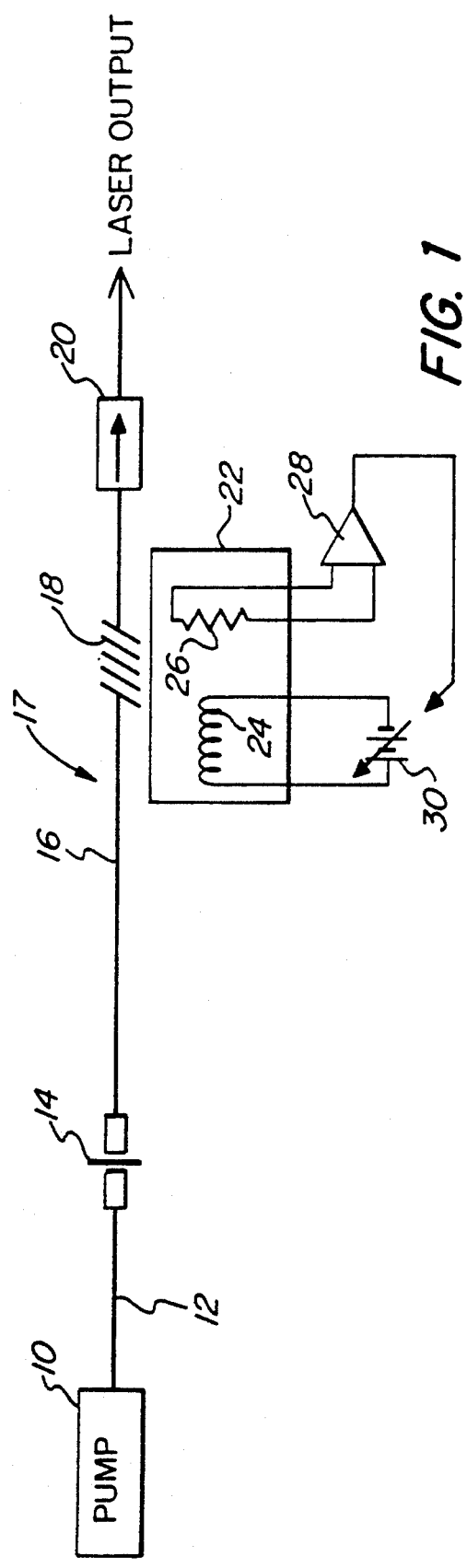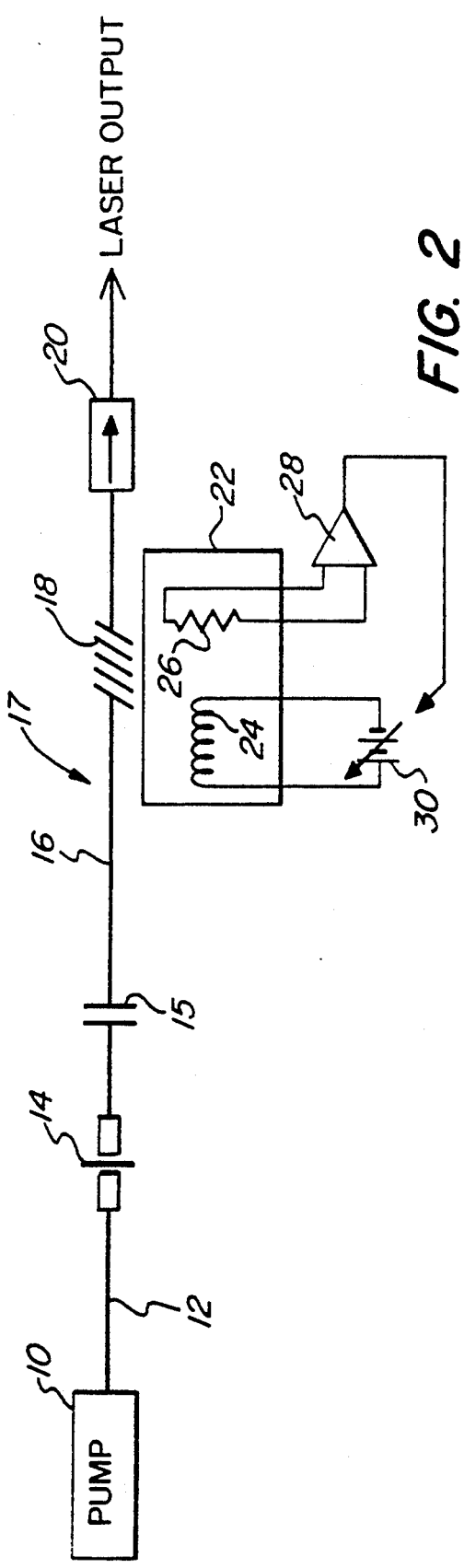
FIG. 1
FIG. 2

5,159,601

METHOD FOR PRODUCING A TUNABLE ERBIUM FIBER LASER

BACKGROUND OF THE INVENTION

The present invention relates to lasers, and more particularly, to a tunable rare-earth doped laser. The doped laser is implemented in an optical transmission medium such as an optical fiber or silica waveguide. The rare-earth material can comprise, for example, erbium or neodymium.

Applications for optical fiber technology are expanding at a rapid pace. Telecommunication, sensors, medical and video transmission can all take advantage of optical technology, particularly where virtually unlimited bandwidth and low attenuation are beneficial. Cable television systems are one example where optical fiber technology is providing efficient and economical alternatives to prior coaxial cable distribution schemes.

Many applications for fiber optic technology would be more cost effective if higher power lasers operating in the 1.3 or 1.5 micron ("$\mu$m") region were available. It has been demonstrated that a $Er^{3+}$ fiber laser can produce high levels of power. See, e.g., M. S. O'Sullivan, et al, "High Power Narrow Linewidth Erbium-Doped Fiber Laser", CLEO 1989, Tup 3, pp. 134–136.

The wavelength emitted by a laser, including a rare-earth doped laser, is not absolutely stable. Various factors, such as temperature fluctuations, can influence the actual oscillation wavelength of a laser. The gradual drift of laser wavelength can change how much light is emitted at the wavelengths corresponding to different longitudinal modes. In some cases, this can lead to "mode hopping", where the laser shifts quickly from one dominant mode to another, at a slightly different wavelength.

Laser cavity optics normally reflect light over a bandwidth that is wide compared to the laser's gain bandwidth. Various devices have been used, such as prisms and gratings, to change the wavelength that can oscillate in the laser cavity, thereby tuning the laser. As long as the selected wavelength remains in the laser's gain bandwidth, the laser can operate. Because all laser media have gain only over limited ranges of wavelengths, their tuning ranges are limited. Since gain influences the power level available from the laser, the output power will change as the laser's wavelength is changed. It is therefore necessary to provide means for tuning a laser, such as a rare-earth doped laser.

It would be advantageous to provide a tunable fiber laser wherein the tuning can be accomplished using an electrical control circuit. It would be further advantageous to provide an electrical tuning system for a rare-earth doped fiber laser of the type that can produce a clean optical carrier for signal transmission.

The present invention provides a laser tuning system having the aforementioned advantages.

SUMMARY OF THE INVENTION

In accordance with the present invention, a tunable fiber laser is provided. A laser cavity includes a temperature sensitive element for establishing a laser wavelength. A heating element is mounted adjacent the temperature sensitive element. Control means, operatively associated with the heating element, are used to adjust the heating element temperature to tune the laser wavelength established by the temperature sensitive element.

In a preferred embodiment, the laser cavity comprises first and second mirrors. A fiber laser has a first end coupled to the first mirror, and a second end coupled to the second mirror. The second mirror can be the temperature sensitive element that is used to establish a laser wavelength. For example, the second mirror can comprise a grating that expands with increasing temperature. The first mirror can comprise a dichroic filter. A Fabry-Perot etalon can be provided in the laser cavity, between the first and second mirrors, to provide longitudinal mode selection. In an illustrated embodiment, the fiber laser is erbium doped.

In a second embodiment, a tunable fiber laser comprises a piezoelectric substrate containing a grating. The grating is provided in a laser cavity, and is used to establish a laser wavelength. Control means apply an electric field to the piezoelectric substrate, thereby adjusting a dimension of the grating to tune the laser wavelength. The laser cavity can comprise a first mirror, a fiber laser having a first end coupled to the first mirror, and a second mirror coupled to a second end of the fiber laser, wherein the grating is the second mirror. The first mirror can comprise, for example, a dichroic filter. A Fabry-Perot etalon can be provided in the laser cavity between the first and second mirrors for mode selection. In an illustrated embodiment, the fiber laser is erbium doped.

BRIEF DESCRIPTION OF THE DRAWINGS

FIG. 1 is a schematic diagram of a tunable erbium fiber laser in accordance with the present invention wherein tuning is accomplished by heating a grating;

FIG. 2 is a schematic diagram of the laser of FIG. 1 further incorporating a Fabry-Perot etalon for mode selection.

DETAILED DESCRIPTION OF THE INVENTION

Figure 3:
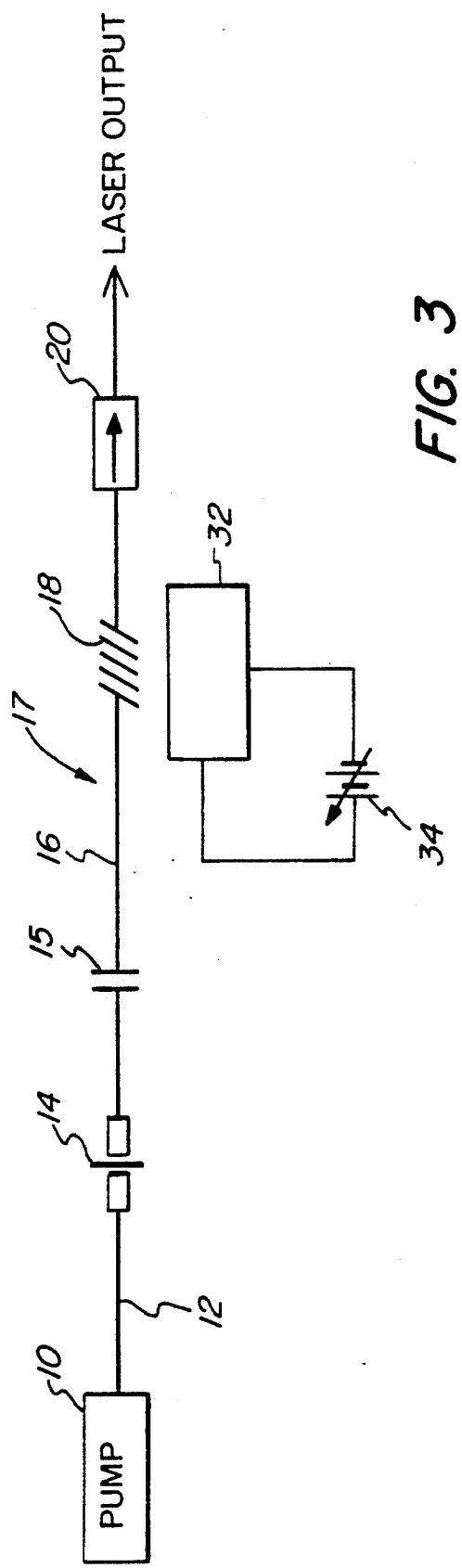
FIG. 3 is another embodiment of a tunable laser in accordance with the present invention, wherein tuning is provided by using a piezoelectric element to change a dimension of a grating.

A first embodiment of a tunable erbium fiber laser is shown in FIG. 1. A laser cavity generally designated 17 includes a first dichroic mirror 14, a second mirror provided by grating 18, and a rare-earth doped fiber 16. Fiber 16 can be doped using, for example, erbium. Those skilled in the art will appreciate that other rare-earth materials, such as neodymium, or other solid state laser systems, can also be used to provide a fiber laser.

The period of grating 18 determines the wavelength of light that is reflected within the laser cavity. This period can be changed by physically stretching or constricting a substrate 22 to which the grating is attached. A resistive heating element 24 embedded in the substrate adjacent the grating is used to heat the grating to expand it and thereby tune the laser wavelength. A thermistor 26 monitors the substrate temperature, thereby providing a sensing element for a conventional electronic feedback circuit including difference amplifier 28 to provide precision control of the grating. The electronic feedback circuit varies the voltage of voltage source 30 to increase or decrease the amount of heat provided by heating element 24.

The dichroic mirror 14 illustrated in FIG. 1 allows the light from a pump laser 10 propagating via optical fiber 12 to pass into the laser cavity 17. However, since dichroic filter 14 is highly reflective in the region where fiber 16 has gain (e.g., 1530 nm to 1570 nm for an erbium fiber), the laser wavelength will not pass back out through dichroic filter 14 towards pump 10. Instead, the laser wavelength is emitted from the laser cavity 17 via grating 18, to an optical isolator 20 that supports the traveling wave oscillation in only one direction. The desired tuned laser output wavelength is emitted from optical isolator 20 for use in any desired application, such as the provision of an optical carrier for AM distribution of a cable television signal.

Dichroic filters and gratings are well known in the art. Methods for producing a grating in a waveguide, such as in a planar silicon substrate for use in accordance with the present invention, are also known. For example, such techniques are disclosed in Masao Kawachi, "Wavelength Division Multiplexing Integrated Waveguide Components on Si Substrates", CLEO 1989, Paper FG5; K. L. Belsley, et al, "Optically Multiplexed Interferometric Fiber Optics Sensor System", *Fiber Optic and Laser Sensors III*, SPIE Vol. 566, 1985; W. V. Sorin, et al, "Single-Mode Fiber Evanescent Grating Reflector", Optical Fiber Sensor Conference, THCC3, San Diego, Calif., Feb. 13-14, 1985; C. M. Ragdale, "Fiber Grating Devices", SPIE OE/Fiber 1989, Boston, Mass., Sep. 5-8, 1989, pp. 1171-14; and G. Meltz, et al, "In-Fiber Bragg Grating Tap", OFC, 1990, San Francisco, Calif., TUG1.

FIG. 2 illustrates a tunable fiber laser that is identical to that illustrated in FIG. 1, except that a Fabry-Perot etalon 15 has been added between the dichroic mirror 14 and grating 18. The use of Fabry-Perot cavities to provide longitudinal mode selection in a rare-earth element doped laser is disclosed in commonly owned, copending U.S. patent application Ser. No. 07/616,024 filed on Nov. 20, 1990 for "Laser with Longitudinal Mode Selection". A discussion of the operation of Fabry-Perot interferometers can be found in D. R. Huber and J. B. Carroll, "Time Domain Response of an Optically Frequency Swept Fabry-Perot Interferometer", *Applied Optics*, 1986, Vol. 25, pp. 2386-2390. In the present instance, the use of the Fabry-Perot etalon 15 in conjunction with adjustable period grating 18 provides a laser that operates at a narrower optical linewidth.

FIG. 3 illustrates an embodiment wherein the length of grating 18 is varied using a piezoelectric substrate 32 instead of a heating element 24. The piezoelectric effect is well known. In such materials, a mechanical strain results from the application of an electric field. The amount of the strain depends upon the direction and magnitude of the polarization provided by the electric field. In the embodiment of FIG. 3, fiber 16 with embedded grating 18 is attached to the piezoelectric substrate 32, which can comprise, for example, a known piezoelectric ceramic material. Such materials are available from various sources, including Channel Industries of Santa Barbara, Calif. The application of a variable voltage source 34 enables the laser to be tuned by controlling the amount by which grating 18 is stretched or compressed. All of the other components of FIG. 3 are identical to those described above in connection with FIGS. 1 and 2.

It should now be appreciated that the present invention provides wavelength tuning in a rare-earth doped laser by adjusting the length of a grating by thermal variation or mechanical strain. A combination of temperature variation and mechanical strain can also be used to effect tuning, although such a scheme would be more complicated than those illustrated in FIGS. 1 to 3.

Other cavity configurations, such as a ring cavity, can be used to provide a tunable fiber laser in accordance with the present invention. Also, the laser cavity can be fabricated using elements other than those illustrated in the drawings. For example, mirror 14 and/or Fabry-Perot 15 could be replaced by appropriate gratings. In order to replace Fabry-Perot etalon 15 with a grating, the grating should be a bandpass type. This would enable tuning made or selection to be achieved using this element.

Although the invention has been described in connection with various specific embodiments, those skilled in the art will appreciate that various adaptations and modifications may be made thereto without departing from the spirit and scope of the invention, as set forth in the following claims.

What is claimed is:

1. A tunable fiber laser comprising:
   an optical fiber laser cavity including a temperature sensitive element for establishing a laser wavelength;
   a heating element mounted adjacent said temperature sensitive element; and
   circuit control means including said heating element for adjusting the heating element temperature to tune the laser wavelength established by said temperature sensitive element.

2. A laser in accordance with claim 1 wherein said laser cavity comprises:
   a first mirror;
   a fiber laser having a first end coupled to said first mirror; and
   a second mirror coupled to a second end of said fiber laser;
   wherein said second mirror is the temperature sensitive element.

3. A laser in accordance with claim 2 wherein said second mirror is a grating.

4. A laser in accordance with claim 3 wherein said first mirror is a dichroic filter.

5. A laser in accordance with claim 3 further comprising a Fabry-Perot etalon in said laser cavity between said first and second mirrors.

6. A laser in accordance with claim 5 wherein said fiber laser is erbium doped.

7. A laser in accordance with claim 1 further comprising a Fabry-Perot etalon in said laser cavity.

8. A laser in accordance with claim 1 wherein said fiber laser is erbium doped.

9. A laser in accordance with claim 1 wherein said temperature sensitive element is a grating.

10. A tunable fiber laser comprising:
    a piezoelectric substrate
    an optical fiber laser cavity including a grating for establishing a laser wavelength, wherein said grating is bonded to said piezoelectric substrate; and
    control means for applying an electric field to said piezoelectric substrate, thereby adjusting a dimension of said grating to tune the wavelength of said optical fiber laser.

11. A laser in accordance with claim 10 wherein said laser cavity comprises:
    a first mirror;
    a fiber laser having a first end coupled to said first mirror; and
    a second mirror coupled to a second end of said fiber laser;
    wherein said grating is the second mirror.

12. A laser in accordance with claim 11 wherein said first mirror is a dichroic filter.

13. A laser in accordance with claim 11 further comprising a Fabry-Perot etalon in said laser cavity between said first and second mirrors.

14. A laser in accordance with claim 13 wherein said fiber laser is erbium doped.

15. A laser in accordance with claim 10 further comprising a Fabry-Perot etalon in said laser cavity.

16. A laser in accordance with claim 10 wherein said fiber laser is erbium doped.

* * * * *